US012570407B2

(12) United States Patent
Clark et al.

(10) Patent No.: US 12,570,407 B2
(45) Date of Patent: *Mar. 10, 2026

(54) HYBRID ELECTRIC AIRCRAFT INCLUDING FUEL POD WITH ELECTRICAL INTERFACE

(71) Applicant: BETA AIR, LLC, South Burlington, VT (US)

(72) Inventors: Kyle B. Clark, South Burlington, VT (US); Herman Wiegman, South Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 63 days.

This patent is subject to a terminal disclaimer.

(21) Appl. No.: 18/223,210

(22) Filed: Jul. 18, 2023

(65) Prior Publication Data

US 2024/0217670 A1     Jul. 4, 2024

Related U.S. Application Data

(63) Continuation of application No. 17/733,686, filed on Apr. 29, 2022, now Pat. No. 11,745,890.

(51) Int. Cl.
*B64D 37/04* (2006.01)
*B64C 29/00* (2006.01)
(Continued)

(52) U.S. Cl.
CPC ............. *B64D 37/04* (2013.01); *B64D 27/31* (2024.01); *B64D 27/34* (2024.01); *B64D 31/18* (2024.01);
(Continued)

(58) Field of Classification Search
CPC .. B64D 2027/026; B64D 27/24; B64D 35/04; B64D 37/04; B64C 29/0008
(Continued)

(56) References Cited

U.S. PATENT DOCUMENTS

| | | | |
|---|---|---|---|
| 6,089,252 A | 7/2000 | Braun | |
| 8,991,743 B1 | 3/2015 | Pope et al. | |

(Continued)

FOREIGN PATENT DOCUMENTS

IN     201911029064 A     8/2021

OTHER PUBLICATIONS

Loz Blain, Airbus proposes detachable hydrogen propulsion pods for aircraft, Dec. 21, 2020.
(Continued)

*Primary Examiner* — Brady W Frazier
(74) *Attorney, Agent, or Firm* — Lee & Hayes, P.C.

(57) ABSTRACT

A fuel pod for a hybrid electric aircraft. The fuel pod includes a housing, a fuel tank, a generator and a connection mechanism. The fuel tank is contained within the housing and is configured to hold a fuel therein. The generator is contained within the housing and is connected to the fuel tank. The generator is configured to power at least one of a plurality of flight components of a hybrid electric aircraft. The connection mechanism is at the housing and is configured to removably attach the fuel pod to the hybrid electric aircraft. The connection mechanism includes an electrical interface configured to electrically link to at least one of the plurality of flight components of the hybrid electric aircraft, and a communication interface configured to communicatively link to a flight controller communicatively connected to the hybrid electric aircraft.

19 Claims, 8 Drawing Sheets

(51) Int. Cl.

| | |
|---|---|
| *B64D 27/02* | (2006.01) |
| *B64D 27/31* | (2024.01) |
| *B64D 27/34* | (2024.01) |
| *B64D 31/18* | (2024.01) |
| *B64D 35/04* | (2006.01) |

(52) U.S. Cl.
CPC .......... *B64D 35/04* (2013.01); *B64C 29/0008* (2013.01); *B64D 27/026* (2024.01)

(58) Field of Classification Search
USPC ...................................................... 244/135 R
See application file for complete search history.

(56)                References Cited

U.S. PATENT DOCUMENTS

| | | |
|---|---|---|
| 10,017,264 B2 | 7/2018 | Joubert et al. |
| 10,501,199 B2 | 12/2019 | Horn |
| 10,730,611 B2 | 8/2020 | Utt |
| 10,793,285 B2 | 10/2020 | Kooiman et al. |
| 10,870,479 B2 | 12/2020 | Courtin |
| 2016/0244160 A1 | 8/2016 | Colten et al. |
| 2018/0354615 A1 | 12/2018 | Groninga et al. |
| 2019/0338738 A1 | 11/2019 | Furgurson et al. |
| 2020/0140079 A1 | 5/2020 | Campbell |
| 2021/0254556 A1 | 8/2021 | Asselin |
| 2021/0310412 A1 | 10/2021 | Williams et al. |
| 2021/0387723 A1 | 12/2021 | Moon et al. |
| 2022/0041299 A1 | 2/2022 | Wankewycz et al. |

OTHER PUBLICATIONS

Aircraft Systems, Types of Aircraft Fuel Tanks, Nov. 22, 2021.
Dean Sigler , A Range Extender You Can Ride Home, Sep. 28, 2017.
Steven Fletcher, Hybrid Electric Aircraft, Sep. 1, 2016.
Office Action for U.S. Appl. No. 17/733,686 mailed Jan. 30, 2023, 17 pages.
Office Action for U.S. Appl. No. 17/733,686 mailed Oct. 11, 2022, 13 pages.
Office Action for U.S. Appl. No. 17/733,686 mailed Dec. 13, 2022, 16 pages.

HYBRID ELECTRIC AIRCRAFT INCLUDING FUEL POD WITH ELECTRICAL INTERFACE

CROSS-REFERENCE TO RELATED APPLICATIONS

This application is a continuation of Non-provisional application Ser. No. 17/733,686 filed on Apr. 29, 2022 and entitled "FUEL POD FOR HYBRID ELECTRIC AIR-CRAFT," which is incorporated by reference herein in its entirety.

FIELD OF THE INVENTION

The present invention generally relates to the field of aircraft power systems. In particular, the present invention is directed to an hybrid electric aircraft.

BACKGROUND

Hybrid electric aircraft utilize at least two sources of energy to power the aircraft. However, optimal management of the power systems of such aircraft can be a complex task and involve challenges.

SUMMARY OF THE DISCLOSURE

In an aspect, a hybrid electric aircraft is provided. The fuel pod includes a housing, a fuel tank, a generator and a connection mechanism. The fuel tank is contained within the housing and is configured to hold a fuel therein. The generator is contained within the housing and is connected to the fuel tank. The generator is configured to power at least one of a plurality of flight components of a hybrid electric aircraft. The connection mechanism is at the housing and is configured to attach the fuel pod to the hybrid electric aircraft. The connection mechanism includes an electrical interface configured to electrically link to at least a flight component of the hybrid electric aircraft, and a communi-cation interface configured to communicatively link to a flight controller communicatively connected to the hybrid electric aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumen-talities shown in the drawings, wherein.

Figure 1:
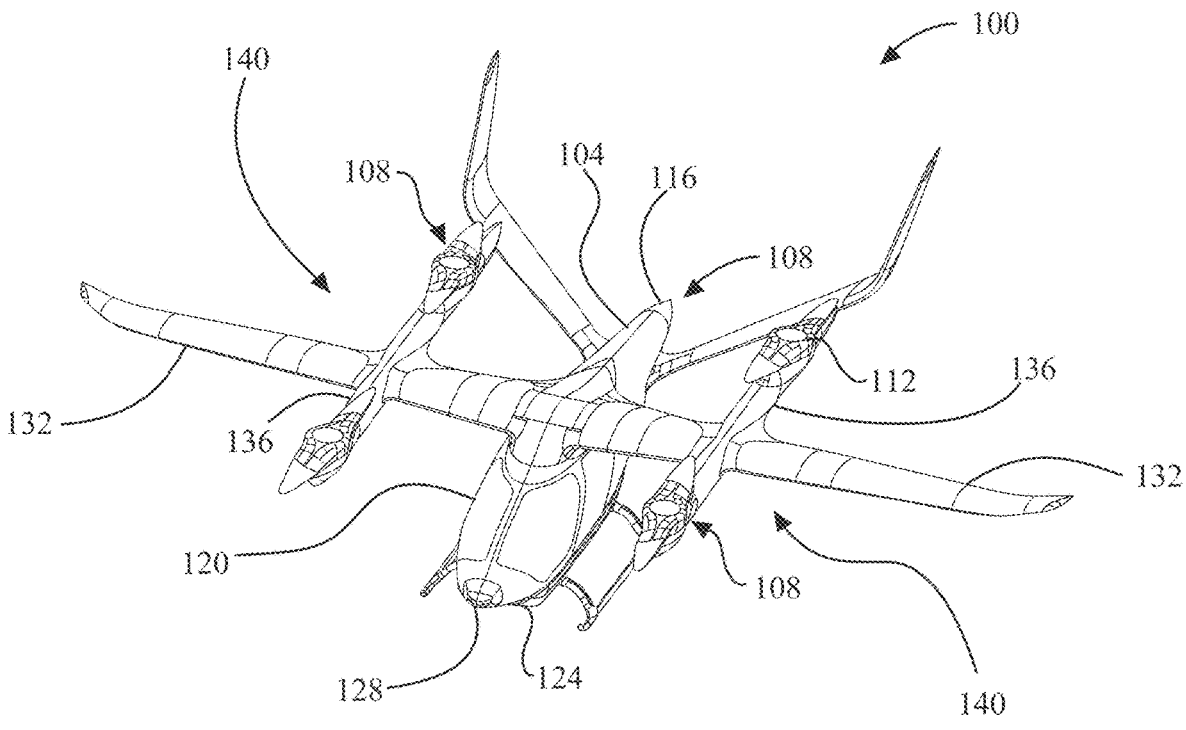
FIG. 1 is a diagrammatic representation of an exemplary embodiment of a hybrid electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of expla-nation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodi-ments of the disclosure and are not intended to limit the scope of the disclosure, which is defined by the claims. For purposes of description herein, the terms "upper", "lower", "left", "rear", "right", "front", "vertical", "horizontal", "upward", "downward", "forward", "backward" and deriva-tives thereof shall relate to the orientation in FIG. 1. Fur-thermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments dis-closed herein are not to be considered as limiting, unless the claims expressly state otherwise.

At a high level, aspects of the present disclosure are directed to a fuel pod for a hybrid electric aircraft. In an embodiment, hybrid electric aircraft may include a hybrid electric vertical takeoff and landing (VTOL) aircraft. Aspects of the present disclosure can be used to provide a self-contained and removably attachable for enhancing air-craft flight range. Aspects of the present disclosure can also be used to selectively use a fuel pod for powering hybrid electric aircraft. This is so, at least in part, because of the detachable features of fuel pod which can include both a fuel tank and a generator. Aspects of the present disclosure advantageously allow for enhanced versatility to optimize performance based on factors such as payload, flight plan and flight mode. Hybridization can desirably offer enhanced payload and flight range capabilities. For example, for a given payload, hybridization may extend flight range by about an order of magnitude.

In some cases, two fuel pods in conjunction with three battery packs may be provided for hybrid electric aircraft. These fuel pods may also be referred to as a "hybrid kit" which is removable attachable to aircraft. The attachment may include "bolt-on" certification which has regulatory approval such as a supplemental type certificate (STC) issued by the Federal Aviation Administration (FAA). The connection of the fuel pod to aircraft may advantageously utilize a n electrical interface and a communication interface in combination with a mechanical interface. Advantageously, the simplicity and elegance of this design van add an added dimension of value to certain embodiments of the invention. Each fuel pod may be configured to generate a predetermined amount of power, as needed or desired. For instance, and without limitation, each fuel may have a power capacity in the range from about 60 kW to about 500 kW. In some cases, each fuel pod may have a power capacity in the range from about 60 kW to about 85 kW. In some cases, each fuel pod may have a power capacity in the range from about 250 KW to about 500 kW. Fuel pod may be capable of powering flight components (e.g. electric motor, lift component, pusher component, propulsor) of aircraft. Fuel pod may also be capable of charging or recharging one or more battery packs and/or batteries of aircraft. This charging or recharging may be performed in-flight, as needed or desired. Fuel pod may be removably attached to a suitable structure of aircraft such as a boom, a wing, a fuselage, or the like. In some cases, fuel pod may be removably attached to a lower surface of a boom of aircraft. In some cases, a pair of fuel pods may be removably attached to a respective one of a pair of booms of aircraft. Aircraft booms may be provided with hard points and/or ports to facilitate removable connection with a connection mechanism and/or connector of fuel pod. Desirably, a self-contained fuel pod including both a fuel tank (with integral fuel) and generator enhances the ease of converting an electric aircraft to a hybrid electric aircraft, as needed or desired. The connection mechanisms involved may be such so as to facilitate removable attachment of other structures or pods to aircraft, for example, and without limitation, additional payload. Exemplary embodiments illustrating aspects of the present disclosure are described below in the context of several specific examples.

Referring now to FIG. 1, an exemplary embodiment of a hybrid electric aircraft 100 is illustrated. In an embodiment, hybrid electric aircraft may include a hybrid electric vertical takeoff and landing (VTOL) aircraft. As used in this disclosure, an "aircraft" is any vehicle that may fly by gaining support from the air. As a non-limiting example, aircraft may include airplanes, helicopters, commercial, personal and/or recreational aircrafts, instrument flight aircrafts, drones, electric aircrafts, hybrid electric aircrafts, electric aerial vehicles, airliners, rotorcrafts, vertical takeoff and landing aircrafts, jets, airships, blimps, gliders, paramotors, quadcopters, unmanned aerial vehicles (UAVs) and the like. As used in this disclosure, an "electric aircraft" is an electrically powered aircraft such as one powered by one or more electric motors or the like. Electrically powered (or electric) aircraft may be an electric vertical takeoff and landing (eVTOL) aircraft. In some embodiments, aircraft may include a hybrid electric aircraft, for example and without limitation, an aircraft that may be powered by two or more energy sources. Aircraft may be capable of rotor-based cruising flight, rotor-based takeoff, rotor-based landing, fixed-wing cruising flight, airplane-style takeoff, airplane-style landing, and/or any combination thereof. Aircraft may include one or more manned and/or unmanned aircrafts. Aircraft may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, aircraft may be configured with an electric propulsion assembly. Including one or more propulsion and/or flight components. Electric propulsion assembly may include any electric propulsion assembly (or system) as described in U.S. Nonprovisional application Ser. No. 16/703,225, filed on Dec. 4, 2019, and entitled "AN INTEGRATED ELECTRIC PROPULSION ASSEMBLY," the entirety of which is incorporated herein by reference.

Still referring to FIG. 1, as used in this disclosure, a "vertical take-off and landing (VTOL) aircraft" is one that can hover, take off, and land vertically. An "electric vertical takeoff and landing aircraft" or "eVTOL aircraft", as used in this disclosure, is an electrically powered VTOL aircraft. In order to optimize the power and energy necessary to propel the aircraft, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad copter," multi-rotor helicopter, or other vehicle that maintains its lift primarily using downward thrusting propulsors. "Fixed-wing flight", as described herein, is where the aircraft is capable of flight using wings and/or foils that generate lift caused by the aircraft's forward airspeed and the shape of the wings and/or foils, such as airplane-style flight.

Still referring to FIG. 1, in an embodiment, aircraft 100 is a hybrid electric aircraft and is powered by a hybrid electric power system. A hybrid electric vehicle (HEV) or aircraft may be a type of hybrid vehicle or aircraft that combines an internal combustion engine (ICE) system with an electric propulsion system. As used in the present disclosure, a "hybrid electric vehicle" or "hybrid electric aircraft" is any vehicle or aircraft that combines a minimum of two sources of energy for propulsion. For example, and without limitation, the two sources can be either gasoline or diesel fuel combined with a battery. In some hybrid vehicles or aircrafts, both of these power systems may propel vehicle or aircraft separately or together. As used in this disclosure, "a hybrid electric VTOL aircraft" is an aircraft that combines hybrid electric and VTOL features. In some embodiments, aircraft 100 may include a hybrid electric aircraft. In some embodiments, aircraft 100 may include a hybrid electric VTOL aircraft.

Still referring to FIG. 1, hybrid electric aircraft 100, in some embodiments, may include a fuselage 104, flight component 108 (or plurality of flight components 108), a pilot control 120, a flight controller 124, a sensor (or aircraft sensor) 128 (or a plurality of sensors (or aircraft sensors) 128), a pair of wings 132, a pair of booms 136 and a power system 140. In one embodiment, flight components 108 may include at least a lift component 112 (or a plurality of lift components 112) and at least a pusher component 116 (or a plurality of pusher components 116). Hybrid electric aircraft and power system is also described further below with reference to at least FIG. 2.

Still referring to FIG. 1, as used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 104 may include structural elements that physically support a shape and structure of an aircraft. Structural elements may take a plurality of forms, alone or in combination with other types. Structural elements may vary depending on a construction type of aircraft such as without limitation a fuselage 104. Fuselage 104 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber.

Still referring to FIG. 1, it should be noted that an illustrative embodiment is presented only, and this disclosure in no way limits the form or construction method of any of the aircrafts as disclosed herein. In embodiments, fuselage 104 may be configurable based on the needs of the aircraft per specific mission or objective. The general arrangement of components, structural elements, and hardware associated with storing and/or moving a payload and/or fuel pods or tanks may be added or removed from fuselage 104 as needed, whether it is stowed manually, automatedly, or removed by personnel altogether. Fuselage 104 may be configurable for a plurality of storage and loading options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 104 may also be configurable to accept certain specific cargo containers and/or fuel pods or tanks, or a receptable that can, in turn, accept certain cargo containers and/or fuel pods or tanks.

Still referring to FIG. 1, hybrid electric aircraft 100 may include a plurality of laterally extending elements attached to fuselage 104. As used in this disclosure a "laterally extending element" is an element that projects essentially horizontally from fuselage, including an outrigger, a spar, and/or a fixed wing that extends from fuselage. Wings 132 may be structures which include airfoils configured to create a pressure differential resulting in lift. Wings 132 may generally be disposed on the left and right sides of the aircraft symmetrically, at a point between nose and empennage. Wings 132 may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element or wings may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element or wings may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground. In some embodiments, winglets may be provided at terminal ends of the wings which can provide improved aerodynamic efficiency and stability in certain flight situations. In some embodiments, the wings may be foldable to provide a compact aircraft profile, for example, for storage, parking and/or in certain flight modes.

Continuing to refer to FIG. 1, hybrid electric aircraft 100 may include plurality of flight components 108. As used in this disclosure a "flight component" is a component that promotes flight and guidance of an aircraft. Flight component 108 may include power sources, control links to one or more elements, fuses, and/or mechanical couplings used to drive and/or control any other flight component. Flight component 108 may include a motor that operates to move one or more flight control components, to drive one or more propulsors, or the like. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. Flight component 108 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery), a turbine, an engine, and the like. An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an aircraft. An energy source may also include one or more fuel tanks.

With continued reference to FIG. 1, in an embodiment, flight component 108 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 1, in an embodiment, plurality of flight components 108 of aircraft 100 may include at least a lift component 112 and at least a pusher component 116. Flight component 108 may include a propulsor, a propeller, a motor, rotor, a rotating element, electrical energy source, battery, and the like, among others. Each flight component may be configured to generate lift and flight of hybrid electric aircraft. In some embodiments, flight component 108 may include one or more lift components 112, one or more pusher components 116, one or more battery packs including one or more batteries or cells, and one or more electric motors. Flight component 108 may include a propulsor. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an aircraft in a direction or other vehicle while on ground or in-flight.

Still referring to FIG. 1, in some embodiments, lift component 112 may include a propulsor, a propeller, a blade, a motor, a rotor, a rotating element, an aileron, a rudder, arrangements thereof, combinations thereof, and the like. Each lift component 112, when a plurality is present, of plurality of flight components 108 may be configured to produce, in an embodiment, substantially upward and/or vertical thrust such that aircraft moves upward.

Continuing to refer to FIG. 1, as used in this disclosure a "lift component" is a component and/or device used to propel a craft upward by exerting downward force on a fluid medium, which may include a gaseous medium such as air or a liquid medium such as water. Lift component 112 may include any device or component that consumes electrical power on demand to propel an aircraft in a direction or other vehicle while on ground or in-flight. For example, and without limitation, lift component 112 may include a rotor, propeller, propulsor, paddle wheel and the like thereof, which may produce torque along a longitudinal axis and/or a vertical axis. In an embodiment, lift component 112 includes a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift component 112 may include a rotating power-driven hub, to which are attached several radial airfoil-section blades such that the whole assembly rotates about a longitudinal axis. Blades may be configured at an angle of attack. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. In an embodiment, and without limitation, angle of attack may include a variable angle of attack. As used in this disclosure a "variable angle of attack" is a variable and/or moveable angle between a chord line of a blade and relative wind. As used in this disclosure a "variable angle" is an angle that is moveable from an attachment point. In an embodiment, angle of attack be configured to produce a fixed pitch angle. As used in this disclosure a "fixed pitch angle" is a fixed angle between a cord line of a blade and the rotational velocity direction. In an embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

With continued reference to FIG. 1, in an embodiment, lift component 112 may be configured to produce a lift. As used in this disclosure a "lift" is a perpendicular force to the oncoming flow direction of fluid surrounding the surface. For example, and without limitation relative air speed may be horizontal to the aircraft, wherein lift force may be a force exerted in a vertical direction, directing the aircraft upwards. In an embodiment, and without limitation, lift component 112 may produce lift as a function of applying a torque to lift component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components 108 such as a power source(s) may apply a torque on lift component 112 to produce lift.

In an embodiment, and still referring to FIG. 1, a plurality of lift components 112 of plurality of flight components 108 may be arranged in a quad copter orientation. As used in this disclosure a "quad copter orientation" is at least a lift component oriented in a geometric shape and/or pattern, wherein each of the lift components is located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift components oriented in the geometric shape of a hexagon, wherein each of the six lift components are located along the six vertices of the hexagon shape. In an embodiment, and without limitation, quad copter orientation may include a first set of lift components and a second set of lift components, wherein the first set of lift components and the second set of lift components may include two lift components each, wherein the first set of lift components and a second set of lift components are distinct from one another. For example, and without limitation, the first set of lift components may include two lift components that rotate in a clockwise direction, wherein the second set of lift propulsor components may include two lift components that rotate in a counterclockwise direction. In an embodiment, and without limitation, the first set of lift components may be oriented along a line oriented 45° from the longitudinal axis of aircraft 100. In another embodiment, and without limitation, the second set of lift components may be oriented along a line oriented 135° from the longitudinal axis, wherein the first set of lift components line and the second set of lift components are perpendicular to each other.

Still referring to FIG. 1, pusher component 116 and lift component 112 (of flight component(s) 108) may include any such components and related devices as disclosed in U.S. Nonprovisional application Ser. No. 16/427,298, filed on May 30, 2019, entitled "SELECTIVELY DEPLOYABLE HEATED PROPULSOR SYSTEM," U.S. Nonprovisional application Ser. No. 16/703,225, filed on Dec. 4, 2019, entitled "AN INTEGRATED ELECTRIC PROPULSION ASSEMBLY," U.S. Nonprovisional application Ser. No. 16/910,255, filed on Jun. 24, 2020, entitled "AN INTEGRATED ELECTRIC PROPULSION ASSEMBLY," U.S. Nonprovisional application Ser. No. 17/319,155, filed on May 13, 2021, entitled "AIRCRAFT HAVING REVERSE THRUST CAPABILITIES," U.S. Nonprovisional application Ser. No. 16/929,206, filed on Jul. 15, 2020, entitled "A HOVER AND THRUST CONTROL ASSEMBLY FOR DUAL-MODE AIRCRAFT," U.S. Nonprovisional application Ser. No. 17/001,845, filed on Aug. 25, 2020, entitled "A HOVER AND THRUST CONTROL ASSEMBLY FOR DUAL-MODE AIRCRAFT," U.S. Nonprovisional application Ser. No. 17/186,079, filed on Feb. 26, 2021, entitled "METHODS AND SYSTEM FOR ESTIMATING PERCENTAGE TORQUE PRODUCED BY A PROPULSOR CONFIGURED FOR USE IN AN ELECTRIC AIRCRAFT," and U.S. Nonprovisional application Ser. No. 17/321,662, filed on May 17, 2021, entitled "AIRCRAFT FOR FIXED PITCH LIFT," the entirety of each one of which is incorporated herein by reference. Any aircrafts, including electric and eVTOL aircrafts, as disclosed in any of these applications may efficaciously be utilized with any of the embodiments as disclosed herein, as needed or desired. Any flight controllers as disclosed in any of these applications may efficaciously be utilized with any of the embodiments as disclosed herein, as needed or desired.

Still referring to FIG. 1, pusher component 116 may include a propulsor, a propeller, a blade, a motor, a rotor, a rotating element, an aileron, a rudder, arrangements thereof, combinations thereof, and the like. Each pusher component 116, when a plurality is present, of the plurality of flight components 108 may be configured to produce, in an embodiment, substantially forward and/or horizontal thrust such that the aircraft moves forward.

Still referring to FIG. 1, as used in this disclosure a "pusher component" is a component that pushes and/or thrusts an aircraft through a medium. As a non-limiting example, pusher component 116 may include a pusher propeller, a paddle wheel, a pusher motor, a pusher propulsor, and the like. Additionally, or alternatively, pusher flight component may include a plurality of pusher flight components. Pusher component 116 may be configured to produce a forward thrust. As a non-limiting example, forward thrust may include a force to force aircraft in a horizontal direction along the longitudinal axis. As a further non-limiting example, pusher component 116 may twist and/or rotate to pull air behind it and, at the same time, push aircraft 100 forward with an equal amount of force. In an embodiment, and without limitation, the more air forced behind aircraft, the greater the thrust force with which the aircraft is pushed horizontally will be. In another embodiment, and without limitation, forward thrust may force aircraft 100 through the medium of relative air. Additionally or alternatively, plurality of flight components 108 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Still referring to FIG. 1, in an embodiment, aircraft 100 may include a pilot control 120. As used in this disclosure, a "pilot control" is a mechanism or means which allows a pilot to monitor and control operation of aircraft such as its flight components (for example, and without limitation, pusher component, lift component and other components such as propulsion components). For example, and without limitation, pilot control 120 may include a collective, inceptor, foot bake, steering and/or control wheel, control stick, pedals, throttle levers, and the like. Pilot control 120 may be configured to translate a pilot's desired torque for each flight component of the plurality of flight components, such as without limitation, pusher component 116 and lift component 112. Pilot control 120 may be configured to control, via inputs and/or signals such as from a pilot, the pitch, roll, and yaw of the aircraft. Pilot control may be available onboard aircraft or remotely located from it, as needed or desired.

Still referring to FIG. 1, as used in this disclosure a "collective control" or "collective" is a mechanical control of an aircraft that allows a pilot to adjust and/or control the pitch angle of plurality of flight components 108. For example and without limitation, collective control may alter and/or adjust the pitch angle of all of the main rotor blades collectively. For example, and without limitation pilot control 120 may include a yoke control. As used in this disclosure a "yoke control" is a mechanical control of an aircraft to control the pitch and/or roll. For example and without limitation, yoke control may alter and/or adjust the roll angle of aircraft 100 as a function of controlling and/or maneuvering ailerons. In an embodiment, pilot control 120 may include one or more foot-brakes, control sticks, pedals, throttle levels, and the like thereof. In another embodiment, and without limitation, pilot control 120 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of aircraft, perpendicular to the wings. For example, and without limitation, a positive yawing motion may include adjusting and/or shifting nose of aircraft 100 to the right. Principal axis may include a pitch axis. As used in this disclosure a "pitch axis" is an axis that is directed towards the right laterally extending wing of aircraft. For example, and without limitation, a positive pitching motion may include adjusting and/or shifting nose of aircraft 100 upwards. Principal axis may include a roll axis. As used in this disclosure a "roll axis" is an axis that is directed longitudinally towards nose of aircraft, parallel to fuselage. For example, and without limitation, a positive rolling motion may include lifting the left and lowering the right wing concurrently. Pilot control 120 may be configured to modify a variable pitch angle. For example, and without limitation, pilot control 120 may adjust one or more angles of attack of a propulsor or propeller.

Still referring to FIG. 1, aircraft 100 may include one or more sensor(s) (or aircraft sensor(s)) 128. Sensor(s) 128 may include any sensor or noise monitoring circuit described in this disclosure. Sensor(s) are also described further below with reference to at least FIG. 2. Sensor 128, in some embodiments, may be communicatively connected or coupled to flight controller 124. Sensor may be a device, module, and/or subsystem, utilizing any hardware, software, and/or any combination thereof to sense a characteristic and/or changes thereof, in an instant environment, for instance without limitation a pilot control 120, which the sensor is proximal to or otherwise in a sensed communication with, and transmit information associated with the characteristic, for instance without limitation digitized data. Sensor 128 may be mechanically and/or communicatively coupled or connected to aircraft 100, including, for instance, to at least a pilot control 120. Sensor 128 may be configured to sense a characteristic associated with at least a pilot control 120. An environmental sensor may include without limitation one or more sensors used to detect ambient temperature, barometric pressure, and/or air velocity. Sensor 128 may include without limitation gyroscopes, accelerometers, inertial measurement unit (IMU), and/or magnetic sensors, one or more humidity sensors, one or more oxygen sensors, or the like. Additionally or alternatively, sensor 128 may include at least a geospatial sensor. Sensor 128 may be located inside aircraft, and/or be included in and/or attached to at least a portion of aircraft. Sensor may include one or more proximity sensors, displacement sensors, vibration sensors, and the like thereof. Sensor may be used to monitor the status of aircraft 100 for both critical and non-critical functions. Sensor may be incorporated into vehicle or aircraft or be remote.

Still referring to FIG. 1, non-limiting examples of sensor 128 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 128 may sense a characteristic as an analog measurement, for instance, yielding a continuously variable electrical potential indicative of the sensed characteristic. In these cases, sensor 128 may additionally comprise an analog to digital converter (ADC) as well as any additionally circuitry, such as without limitation a Wheatstone bridge, an amplifier, a filter, and the like. For instance, in some cases, sensor 128 may comprise a strain gage configured to determine loading of one or more aircraft components, for instance landing gear. Strain gage may be included within a circuit comprising a Wheatstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 100, for instance without limitation a computing system, a pilot display, and a memory component. Alternatively or additionally, sensor 128 may sense a characteristic of a pilot control 120 digitally. For instance in some embodiments, sensor 128 may sense a characteristic through a digital means or digitize a sensed signal natively. In some cases, for example, sensor 128 may include a rotational encoder and be configured to sense a rotational position of a pilot control; in this case, the rotational encoder digitally may sense rotational "clicks" by any known method, such as without limitation magnetically, optically, and the like. Sensor 128 may include any of the sensors as disclosed in the present disclosure. Sensor 128 may include a plurality of sensors or a sensor suite. Any of these sensors may be located at any suitable position in or on aircraft 100. As noted above, further embodiments of sensor(s) 128 are also described further below with reference to at least FIG. 2.

Still referring to FIG. 1, hybrid electric aircraft 100 may include at least a controller or computing device such as flight controller 124. Flight controller 124 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system and/or computing device.

Continuing to refer to FIG. 1, controller (or computing device) such as flight controller 124 may be designed and/or configured to perform any method, method step, or sequence of method steps in any embodiment described in this disclosure, in any order and with any degree of repetition. For instance, controller (or computing device) may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 2:
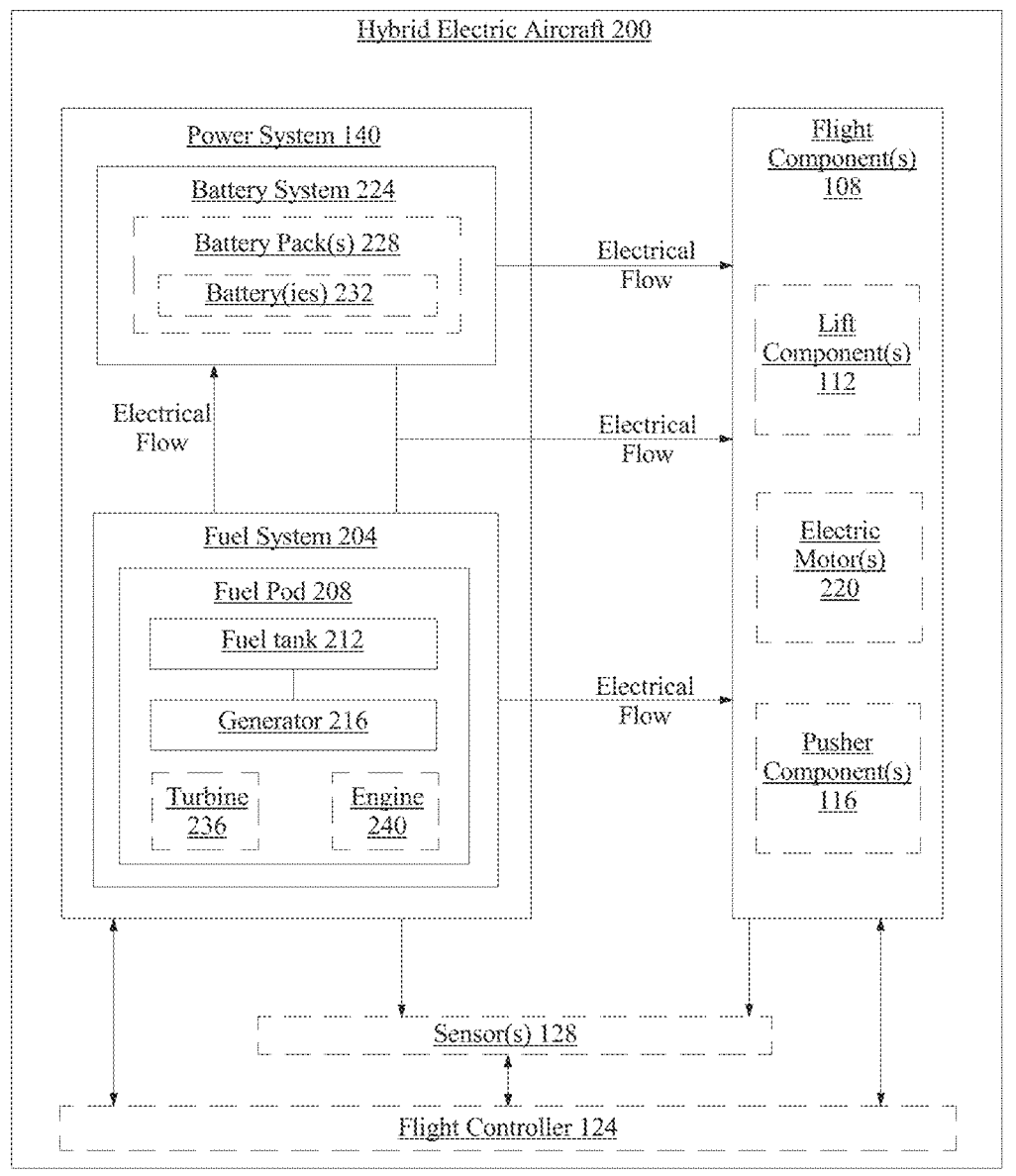
FIG. 2 is a block diagram of an exemplary embodiment of a hybrid electric aircraft.
Figure 6:
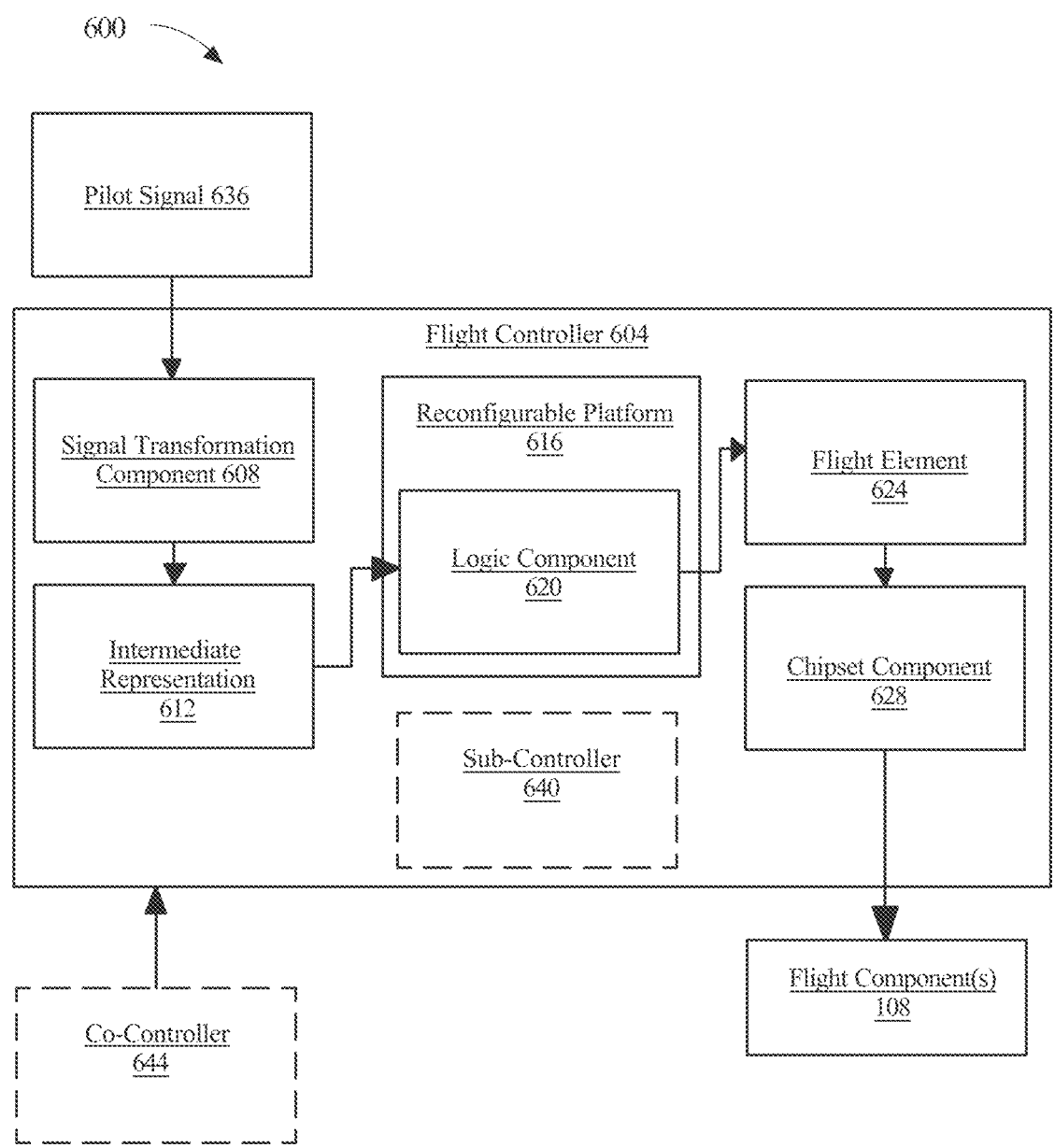
FIG. 6 is a block diagram of an exemplary embodiment of a flight controller.

With continued reference to FIG. 1, in some embodiments, hybrid electric aircraft 100 may include, or may be coupled to or communicatively connected to, flight controller 124 which is described further with reference to at least FIG. 2 and FIG. 6. As used in this disclosure a "flight controller" is a computing device of a plurality of computing devices dedicated to data storage, security, distribution of traffic for load balancing, and flight instruction. In embodiments, flight controller may be installed in an aircraft, may control the aircraft remotely, and/or may include an element installed in the aircraft and a remote element in communication therewith. Flight controller 124, in an embodiment, is located within fuselage 104 of aircraft. In accordance with some embodiments, flight controller may be configured to select a flight mode of aircraft such as to operate a vertical lift flight (upwards or downwards, takeoff, landing, climb or descent), a fixed wing flight (forward or backwards), a transition between a vertical lift flight and a fixed wing flight, and a combination of a vertical lift flight and a fixed wing flight. In other embodiments, flight mode may be selected by a pilot, user or the like.

Still referring to FIG. 1, in an embodiment, and without limitation, flight controller 124 may be configured to operate a fixed-wing flight capability. A "fixed-wing flight capability" can be a method of flight (or flight mode) wherein the plurality of laterally extending elements or wings generate lift. For example, and without limitation, fixed-wing flight capability may generate lift as a function of an airspeed of aircraft 100 and one or more airfoil shapes of the laterally extending elements. As a further non-limiting example, flight controller 124 may operate the fixed-wing flight capability as a function of reducing applied torque on lift (propulsor) component 112. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift (propulsor) components present in aircraft 100. Inertia compensator may alternatively or additionally include any computing device used as an inertia compensator as described in U.S. Nonprovisional application Ser. No. 17/106,557, filed on Nov. 30, 2020, and entitled "SYSTEM AND METHOD FOR FLIGHT CONTROL IN ELECTRIC AIRCRAFT," the entirety of which is incorporated herein by reference. Flight controller 124 may efficaciously include any flight controllers as disclosed in U.S. Nonprovisional application Ser. No. 17/106,557, filed on Nov. 30, 2020, and entitled "SYSTEM AND METHOD FOR FLIGHT CONTROL IN ELECTRIC AIRCRAFT."

In an embodiment, and still referring to FIG. 1, flight controller 124 may be configured to perform a reverse thrust command. As used in this disclosure a "reverse thrust command" is a command to perform a thrust that forces a medium towards the relative air opposing aircraft 100. Reverse thrust command may alternatively or additionally include any reverse thrust command as described in U.S. Nonprovisional application Ser. No. 17/319,155, filed on May 13, 2021, and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155. Flight controller 124 may efficaciously include any flight controllers as disclosed in U.S. Nonprovisional application Ser. No. 17/319,155, filed on May 13, 2021, and entitled "AIRCRAFT HAVING REVERSE THRUST CAPABILITIES."

Continuing to refer to FIG. 1, in an embodiment, flight controller 124 may be configured to perform a corrective action as a function of a failure event. As used in this disclosure a "corrective action" is an action conducted by the plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, filed on Apr. 5, 2021, and entitled "AIRCRAFT FOR SELF-NEUTRALIZING FLIGHT," the entirety of which is incorporated herein by reference. As used in this disclosure a "failure event" is a failure of a flight component of the plurality of flight components. For example, and without limitation, a failure event may denote a rotation degradation of a rotor, a reduced torque of a rotor, and the like thereof. Additionally or alternatively, failure event may include any failure event as described in U.S. Nonprovisional application Ser. No. 17/113,647, filed on Dec. 7, 2020, and entitled "IN-FLIGHT STABILIZATION OF AN AIRCRAFT," the entirety of which is incorporated herein by reference. Flight controller 124 may efficaciously include any flight controllers as disclosed in U.S. Nonprovisional application Ser. Nos. 17/222,539 and 17/113,647.

With continued reference to FIG. 1, flight controller 124 may include one or more computing devices. Computing device may include any computing device as described in this disclosure. Flight controller 124 may be onboard aircraft 100 and/or flight controller 124 may be remote from aircraft 100, as long as, in some embodiments, flight controller 124 is communicatively connected to aircraft 100. As used in this disclosure, "remote" is a spatial separation between two or more elements, systems, components or devices. Stated differently, two elements may be remote from one another if they are physically spaced apart. In an embodiment, flight controller 124 may include a proportional-integral-derivative (PID) controller.

Still referring to FIG. 1, in some embodiments, hybrid electric aircraft 100 may include one or more booms, a plurality of booms or a pair of booms 136. Booms 136 may extend generally parallel to fuselage 104 on either side of fuselage 104. A respective one of booms 136 may be connected to a respective one of wings 132. Booms 136 may extend generally perpendicularly to wings 132 or they may have a different angular orientation with respect to wings, as needed or desired. Booms 136 may be configured to contain or be attachable to ancillary items such as fuel tanks, fuel pods, cargo, payload, and the like, among others. Booms 13 may provide a supporting and/or loading structure for ancillary items and/or aircraft. Booms 136 may be fabricated from substantially the same material as fuselage 104 and/or wings 132, as needed or desired. Booms 136 may include one or more internal or external latching mechanisms to facilitate attachment to ancillary items.

Still referring to FIG. 1, in some embodiments, hybrid electric aircraft 100 may include a power system 140. As also discussed further with reference to at least FIG. 2, power system 140 may be configured to generate electrical energy to power various flight components of aircraft. Power system 140 may include a hybrid electric power system generating electrical power from at least two energy sources such as a battery system and a fuel system. Embodiments of various power system configurations are discussed further with reference to at least FIG. 2.

Referring now to FIG. 2, an exemplary embodiment of a hybrid electric aircraft 200 is illustrated. Hybrid electric aircraft 200 can be the same, substantially the same or similar to the hybrid electric aircraft 100 of FIG. 1 or any of the other such aircrafts disclosed in the entirety of the present disclosure. For purposes of readability, the same reference numerals as FIG. 1 may be used to refer to like elements in FIG. 2.

Still referring to FIG. 2, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 2, in some embodiments, a hybrid electric aircraft 200 may be provided. In some embodiments, hybrid electric aircraft 200 may include a fuselage (e.g. fuselage 104 of FIG. 1), a pair of wings (e.g. wings 132 of FIG. 1), a pair of booms (e.g. booms 136 of FIG. 1), a plurality of flight components 108 and a power system 140. Pair of wings may be connected to fuselage and extends generally laterally therefrom with each wing on either side of fuselage. Each boom of pair of booms may be connected (or attached) to a respective one of the wings with each boom extending generally longitudinally and parallel to fuselage. Plurality of flight components 108 may be configured to provide thrust to hybrid electric aircraft 200. Power system 140 may include a battery system 224 and a fuel system 204. Power system 140 may be configured to power plurality of flight components 108. Fuel system 204 may include a pair of fuel pods 208 with each fuel pod containing a fuel tank 212 and a generator 216. Each fuel pod 208 may be mounted to a respective one of booms (e.g. booms 136 of FIG. 1).

Still referring to FIG. 2, fuel system 204 may further include a turbine 236 and/or an engine 240. Turbine 236 and/or engine 240 may be integrated into generator 216 or be separate from generator 216. Battery system 224 may include one or more battery packs 228. Each battery pack 232 may include one or more batteries 232. Hybrid electric aircraft 200 may further include or be communicatively connected to one or more sensors 128. Sensors 128 may include any of the sensors as disclosed in the present disclosure. Hybrid electric aircraft 200 may further include or be communicatively connected to flight controller 124. Flight controller 124 may include any of the flight controllers as disclosed in the present disclosure and described with reference to at least FIG. 1 and FIG. 6. Sensor(s) 128 may be communicatively connected to flight controller 124. Flight component(s) 108 may include one or more lift components 112, pusher components 116, electric motors 220, among other components. Power system 140 may be configured to provide electrical energy and/or electrical flow (e.g. current) to plurality of flight components 108 such as electric motor 220 which in turn may power one or more lift components 112 and/or pusher components 116 to propel aircraft 200.

Continuing to refer to FIG. 2, fuel system 204 may be further configured to charge or recharge at least a battery 232 of battery system 224. As used in this disclosure, "charging" or "recharging" refers to a process of increasing energy stored within an energy source. In some cases, an energy source may include at least a battery and charging may include providing an electrical flow or current to at least a battery. As used in this disclosure, an "electrical flow" or "current" is a flow of charged particles (e.g. electrons) or an electric current flowing within a material or structure which is capable of conducting it. Current may be measured in amperes or the like. As used in this disclosure, a "battery pack" is a set of any number of identical (or non-identical) batteries or individual battery cells. These may be configured in a series, parallel or a mixture of both configuration to deliver a desired electrical flow, current, voltage, capacity, or power density, as needed or desired. A battery may include, without limitation, one or more cells, in which chemical energy is converted into electricity (or electrical energy) and used as a source of energy or power. Power system 140, fuel system 204, battery system 224 and/or aircraft 200 may efficaciously include one or more components such as open-close contactors to provide an electrical connection between systems and aircraft components.

With continued reference to FIG. 2, each fuel pod 208 may be mounted, attached or mechanically connected to an outer lower surface of a respective one of pair of booms (e.g. booms 136 of FIG. 1). Each fuel pod 208 may be mounted, attached or mechanically connected to a connection mechanism or latching mechanism on an outer surface of a respective one of booms (e.g. booms 136 of FIG. 1). Certain embodiments of a connection mechanism and/or latching mechanism are described further below in connection with at least FIG. 3. In modified embodiments, fuel pods 208 may be mounted, attached or mechanically connected to other structures of aircraft such as, without limitation, fuselage, wings, and the like, among others. Each fuel tank 212 may contain a hydrocarbon fuel or a petroleum-based fuel which may be in a liquid or gaseous form and which may be compressed or pressurized. As used in this disclosure, a "pod" is a container or housing. Pod may be a detachable and/or self-contained unit. As used in this disclosure, a "fuel" is a material that is burned or undergoes combustion to produce power. Fuel may include, without limitation, a hydrocarbon fuel, a petroleum-based fuel, a gaseous fuel, a liquid fuel, a solid fuel, natural gas, oil, coal, gasoline, diesel, ethanol, hydrogen, or the like, among others. A "fuel pod", as used in this disclosure, is a pod with at least a fuel therein or a pod designed to hold at least a fuel therein. For the purposes of this disclosure, a "fuel tank" is a container designed to hold fuel or a container with fuel therein.

Still referring to FIG. 2, generator 216 may be configured to convert mechanical energy to electrical energy. Generator 216 may include a turbine generator. Generator 216 may include an engine such as an internal combustion engine (ICE). Generator 216 may include a gas turbine or a diesel turbine. In an embodiment, generator 216 may be connected to at least one electric motor 220 of plurality of flight components 108 to provide electrical flow thereto. Plurality of flight components 108 may include at least one lift component 112. plurality of flight components 108 may include at least one pusher component 116. Plurality of flight components 108 may include at least a propulsor, a blade and/or a blade arrangement.

Still referring to FIG. 2, as used in this disclosure, a "generator" is a device that converts mechanical energy and/or chemical energy to electrical energy. For example, a generator may convert motive power (mechanical energy or kinetic energy) and/or chemical energy (e.g. in fuel cell, or the like) into electrical power for use in an external circuit such as an electric motor. Sources of mechanical energy may include, without limitation, steam turbines, gas turbines, water turbines, internal combustion engines, heat engines, wind turbines, and the like, among others. Generator may also include a diesel generator or be driven by a diesel engine. As used in this disclosure, a "turbine" is a rotary mechanical device that extracts energy from a fluid flow and converts it into useful work. The work produced by a turbine can be used for generating electrical power when combined with a generator. As used in this disclosure, a "turbine generator" is an electric generator driven by a steam, gas or hydraulic turbine. As used in this disclosure, an "engine" is a machine that converts one or more forms of energy into mechanical energy. For example, and without limitation, an engine may convert energy from a source of heat, such as the burning or combustion of a fuel, into mechanical energy, force or motion. As used in this disclosure, an "internal combustion engine" or "ICE" is an engine in which the burning of a fuel occurs in a confined space called a combustion chamber.

Still referring to FIG. 2, power system 140 may be further configured to allow selection between battery system 224 and fuel system 204 for powering plurality of flight components 108. Hybrid electric VTOL aircraft may further include flight controller 124 which may be configured to select at least one of battery system 224 and fuel system 204 for powering at least one of plurality of flight components 108. Selection of at least one of battery system 224 and fuel system 204 by flight controller 124 may be based on a machine-learning model. Training of machine-learning model may be based on battery system state of charge (SOC) data and flight mode (e.g. takeoff, landing, climb, descent, transitions therebetween) data to output an optimum profile for utilizing battery system 224 and/or fuel system 204 for powering aircraft and/or recharging batteries. Machine-learning model may be based on any of the machine-learning features as disclosed in the present disclosure and described below with reference to at least FIG. 7.

Still referring to FIG. 2, fuel system 204 and battery system 224 may operate in series to drive and power plurality of flight components 108. In a modified embodiment, these systems may operate in a parallel configuration or even a series-parallel configuration. Thus, embodiments disclosed herein encompass tandem and/or independent operation of fuel system 204 and battery system 224 of hybrid power systems disclosed herein.

Continuing to refer to FIG. 2, battery system 224 may include at least a battery pack 228. Battery system 224

(and/or battery pack(s) 228) may be mounted in fuselage of aircraft. Battery system 224 (and/or battery pack(s) 228) may be mounted in a bay at a lower portion of fuselage. In modified embodiment, battery system may be mounted at other aircraft structures such as, and without limitation, wings, booms, and the like, among others. Moreover, portions of battery system 224 may be mounted at different locations withing aircraft. As used in this disclosure, a "bay" is a partly enclosed area, inside or outside, a structure. For example, and without limitation, a bay may be an area inside an aircraft's fuselage for placement of a fuel pod and/or a battery pack.

With continued reference to FIG. 2, in some embodiments, hybrid electric aircraft 200 may be configured for flight without fuel system 204 (or a portion thereof). Advantageously, such an adaptable aircraft may provide enhanced versatility based on, for example, travel distance to a particular destination. Such aircraft and/or fuel system features as also discussed further below with reference to at least FIG. 3.

Still referring to FIG. 2, hybrid electric aircraft 200 may further include at least a sensor 128. Sensor 128 may be communicatively connected to flight controller 124. Sensor 128 may include a battery sensor such as a sensor configured to detect a state of charge (SOC) of battery system 224, battery pack 228 and/or battery 232. Sensor 128 may include a sensor configured to detect a flight mode (e.g. takeoff, landing, climb, ascent, descent, transitions therebetween, and the like) of hybrid electric VTOL aircraft 200. Hybridization performance of power system 140 may be optimized by use of sensor(s) 128.

With continued reference to FIG. 2, as used in this disclosure, an "energy source" is a source (or supplier) of energy (or power) to power one or more components. Energy source may include fuel system 204 and power system 140 and any of their elements such as, and without limitation, battery pack(s), battery(ies), fuel pod(s), fuel tank(s), generator(s), turbine(s), engine(s), and the like. As used in this disclosure, a "battery pack" is a set of any number of identical (or non-identical) batteries or individual battery cells. These may be configured in a series, parallel or a mixture of both configuration to deliver a desired electrical flow, current, voltage, capacity, or power density, as needed or desired. A battery may include, without limitation, one or more cells, in which chemical energy is converted into electricity (or electrical energy) and used as a source of energy or power. For example, and without limitation, energy source may be configured provide energy to an aircraft power source that in turn that drives and/or controls any other aircraft component such as other flight components. An energy source may include, for example, an electrical energy source, a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An electrical energy source may also include a battery cell, a battery pack, or a plurality of battery cells connected in series into a module and each module connected in series or in parallel with other modules. Configuration of an energy source containing connected modules may be designed to meet an energy or power requirement and may be designed to fit within a designated footprint in an aircraft.

In an embodiment, and still referring to FIG. 2, an energy source may be used to provide a steady supply of electrical flow or power to a load over the course of a flight by a vehicle or other aircraft. For example, an energy source may be capable of providing sufficient power for "cruising" and other relatively low-energy phases of flight. An energy source may also be capable of providing electrical power for some higher-power phases of flight as well, particularly when the energy source is at a high state of charge (SOC), as may be the case for instance during takeoff. In an embodiment, an energy source may be capable of providing sufficient electrical power for auxiliary loads including without limitation, lighting, navigation, communications, de-icing, steering or other systems requiring power or energy. Further, an energy source may be capable of providing sufficient power for controlled descent and landing protocols, including, without limitation, hovering descent or runway landing. As used herein an energy source may have high power density where electrical power an energy source can usefully produce per unit of volume and/or mass is relatively high. "Electrical power," as used in this disclosure, is defined as a rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Lithium ion (Li-ion) batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an aircraft or drone, such as an hybrid electric aircraft, during moments requiring high rates of power output, including without limitation takeoff, landing, thermal de-icing and situations requiring greater power output for reasons of stability, such as high turbulence situations. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices or components that may be used as an energy source.

Still referring to FIG. 2, an energy source may include a plurality of energy sources, referred to herein as a module of energy sources. A module may include batteries (and/or generators) connected in parallel or in series or a plurality of modules connected either in series or in parallel designed to deliver both the power and energy requirements of the application. Connecting batteries (and/or generators) in series may increase the voltage of at least an energy source which may provide more power on demand. High voltage batteries may require cell matching when high peak load is needed. As more cells are connected in strings, there may exist the possibility of one cell failing which may increase resistance in the module and reduce an overall power output as a voltage of the module may decrease as a result of that failing cell. Connecting batteries (and/or generators) in parallel may increase total current capacity by decreasing total resistance, and it also may increase overall amp-hour capacity. Overall energy and power outputs of at least an energy source may be based on individual battery cell performance or an extrapolation based on measurement of at least an electrical parameter. In an embodiment where an energy source includes a plurality of battery cells, overall power output capacity may be dependent on electrical parameters of each individual cell. If one cell experiences high self-discharge during demand, power drawn from at least an energy source may be decreased to avoid damage to the weakest cell. An energy source may further include, without limitation, wiring, conduit, housing, cooling system, battery management system and fuel management system. Persons skilled in the art will be aware, after reviewing the entirety of this disclosure, of many different components of an energy source.

Continuing to refer to FIG. 2, energy sources, battery packs, batteries, sensors, battery sensors, sensor suites and/or associated methods which may efficaciously be utilized in accordance with some embodiments are disclosed in U.S. Nonprovisional application Ser. No. 17/111,002, filed on Dec. 3, 2020, entitled "SYSTEMS AND METHODS FOR A BATTERY MANAGEMENT SYSTEM INTEGRATED IN A BATTERY PACK CONFIGURED FOR USE IN ELECTRIC AIRCRAFT," U.S. Nonprovisional application Ser. No. 17/108,798, filed on Dec. 1, 2020, and entitled "SYSTEMS AND METHODS FOR A BATTERY MANAGEMENT SYSTEM INTEGRATED IN A BATTERY PACK CONFIGURED FOR USE IN ELECTRIC AIRCRAFT," and U.S. Nonprovisional application Ser. No. 17/320,329, filed on May 14, 2021, and entitled "SYSTEMS AND METHODS FOR MONITORING HEALTH OF AN ELECTRIC VERTICAL TAKE-OFF AND LANDING VEHICLE," the entirety of each one of which is incorporated herein by reference.

With continued reference to FIG. 2, other energy sources, battery packs, batteries, sensors, battery sensors, sensor suites and/or associated methods which may efficaciously be utilized in accordance with some embodiments are disclosed in U.S. Nonprovisional application Ser. No. 16/590,496, filed on Oct. 2, 2019, and entitled "SYSTEMS AND METHODS FOR RESTRICTING POWER TO A LOAD TO PREVENT ENGAGING CIRCUIT PROTECTION DEVICE FOR AN AIRCRAFT," U.S. Nonprovisional application Ser. No. 17/348,137, filed on Jun. 15, 2021, and entitled "SYSTEMS AND METHODS FOR RESTRICTING POWER TO A LOAD TO PREVENT ENGAGING CIRCUIT PROTECTION DEVICE FOR AN AIRCRAFT," U.S. Nonprovisional application Ser. No. 17/008,721, filed on Sep. 1, 2020, and entitled "SYSTEM AND METHOD FOR SECURING BATTERY IN AIRCRAFT," U.S. Nonprovisional application Ser. No. 16/948,157, filed on Sep. 4, 2020, and entitled "SYSTEM AND METHOD FOR HIGH ENERGY DENSITY BATTERY MODULE," U.S. Nonprovisional application Ser. No. 16/948,140, filed on Sep. 4, 2020, and entitled "SYSTEM AND METHOD FOR HIGH ENERGY DENSITY BATTERY MODULE," and U.S. Nonprovisional application Ser. No. 16/948,141, filed on Sep. 4, 2020, and entitled "COOLING ASSEMBLY FOR USE IN A BATTERY MODULE ASSEMBLY," the entirety of each one of which is incorporated herein by reference. Still other energy sources, battery packs, batteries, sensors, sensor suites, charging connectors and/or associated methods which may efficaciously be utilized in accordance with some embodiments are disclosed in U.S. Nonprovisional application Ser. No. 17/405,840, filed on Aug. 18, 2021, entitled "CONNECTOR AND METHODS OF USE FOR CHARGING AN ELECTRIC VEHICLE."

Still referring to FIG. 2, certain battery, battery module and battery pack management systems, devices, components and associated methods including or using a pack monitoring unit (PMU) and a module monitor unit (MMU) which may efficaciously be utilized in accordance with some embodiments are disclosed in U.S. Nonprovisional application Ser. No. 17/529,653, filed on Nov. 18, 2021, and entitled "AN ELECTRIC AIRCRAFT BATTERY PACK AND METHODS OF USE," U.S. Nonprovisional application Ser. No. 17/529,447, filed on Nov. 18, 2021, and entitled "MODULE MONITOR UNIT FOR AN ELECTRIC AIRCRAFT BATTERY PACK AND METHODS OF USE," and U.S. Nonprovisional application Ser. No. 17/529,583, filed on Nov. 18, 2021, and entitled "PACK MONITORING UNIT FOR AN ELECTRIC AIRCRAFT BATTERY PACK AND METHODS OF USE FOR BATTERY MANAGEMENT," the entirety of each one of which is incorporated herein by reference.

Still referring to FIG. 2, as used in this disclosure a "power source" is a source that powers, drives and/or controls any flight component and/or other aircraft component. For example, and without limitation power source may include motor(s) or electric motor(s) 220 that operates to move one or more lift components 112 and/or one or more pusher components 116, to drive one or more blades, or the like thereof. Motor(s) 220 may be driven by direct current (DC) electric power and may include, without limitation, brushless DC electric motors, switched reluctance motors, induction motors, or any combination thereof. Motor(s) 220 may also include electronic speed controllers or other components for regulating motor speed, rotation direction, and/or dynamic braking. A "motor" as used in this disclosure is any machine that converts non-mechanical energy into mechanical energy. An "electric motor" as used in this disclosure is any machine that converts electrical energy into mechanical energy.

Still referring to FIG. 2, in an embodiment, aircraft 200 may further include one or more sensors 128. Sensor(s) 128 may be configured to transmit, directly or indirectly, flight data and system data to flight controller 124 and/or other computing device. Sensor(s) 128 may be communicatively connected to flight controller 124 and/or another computing device. In an embodiment sensor 128 may include a battery sensor. In an embodiment, sensor(s) 128 may be included in or be a part of flight controller 124. Sensor(s) 128 may include any of the sensors as disclosed in the entirety of the present disclosure.

With continued reference to FIG. 2, in some embodiments, sensor 128 may be mechanically connected to aircraft 200. As used herein, a person of ordinary skill in the art would understand "mechanically connected" to mean that at least a portion of a device, component, or circuit is connected to at least a portion of the aircraft via a mechanical connection. Said mechanical connection may be established, for example and without limitation, by mechanical fasteners such as bolts, rivets, screws, nails, bolt-nut combinations, pegs, dowels, pins, rods, locks, latches, clamps, combinations thereof, and the like, among others. Said mechanical connection may include, for example and without limitation, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, adhesive coupling, universal joints, or any combination thereof. In an embodiment, mechanical connection may be used to connect the ends of adjacent parts and/or objects of an electric aircraft. Further, in an embodiment, mechanical connection may be used to join two pieces of rotating aircraft components. In some instances, the terminology "mechanically coupled" may be used in place of mechanically connected in this disclosure.

Still referring to FIG. 2, sensor(s) 128 may include any of the sensors as disclosed in the entirety of the present disclosure including those described with reference to at least FIG. 1. As used in this disclosure, a "sensor" is a device that is configured to detect a phenomenon and transmit information related to the detection of the phenomenon. For example, in some cases a sensor may transduce a detected phenomenon, such as without limitation, voltage, current, resistance, capacitance, impedance, distance, speed, velocity, angular velocity, rotational velocity, acceleration, direction, force, torque, temperature, pressure, humidity, precipitation, density, and the like, into a sensed signal. Sensor may include one or more sensors which may be the same, similar or different. Sensor may include a plurality of sensors which may be the same, similar or different. Sensor may include one or more sensor suites with sensors in each sensor suite being the same, similar or different.

Still referring to FIG. 2, sensor 128 may include any sensor or noise monitoring circuit described in this disclosure. Sensor 128, in some embodiments, may be communicatively connected or coupled to flight controller 124. Sensor may be a device, module, and/or subsystem, utilizing any hardware, software, and/or any combination thereof to sense a characteristic and/or changes thereof, in an instant environment, for example and without limitation, which the sensor may be proximal to or otherwise in a sensed communication with, and transmit information associated with the characteristic, for instance without limitation digitized data. Sensor 128 may be mechanically and/or communicatively coupled to aircraft 200. Sensor 128 may be configured to sense a characteristic associated with, for example and without limitation, a battery, a flight component and/or a pilot control of aircraft. An environmental sensor may include without limitation one or more sensors used to detect ambient temperature, barometric pressure, and/or air velocity. Sensor 128 may include without limitation gyroscopes, accelerometers, inertial measurement unit (IMU), and/or magnetic sensors, one or more humidity sensors, one or more oxygen sensors, or the like. Additionally or alternatively, sensor 128 may include at least a geospatial sensor. Sensor 128 may be located inside aircraft, and/or be included in and/or attached to at least a portion of aircraft. Sensor may include one or more proximity sensors, displacement sensors, vibration sensors, and the like thereof. Sensor may be used to monitor the status of aircraft 200 for both critical and non-critical functions. Sensor may be incorporated into vehicle or aircraft or, in some cases, be remote.

Continuing to refer to FIG. 2, non-limiting examples of sensor 128 may include an inertial measurement unit (IMU), an accelerometer, a gyroscope, a proximity sensor, a pressure sensor, a light sensor, a pitot tube, an air speed sensor, a wind sensor, a position sensor, a speed sensor, a switch, a thermometer, a strain gauge, an acoustic sensor, an electrical sensor, a current sensor, a voltage sensor, a capacitance sensor, a resistance sensor, an impedance sensor, a thermal sensor, a humidity sensor, an angle sensor, a velocity sensor, an acceleration sensor, an optical sensor, a magnetic sensor, an electromagnetic sensor, and the like, among others. In some cases, sensor 128 may sense a characteristic as an analog measurement, for instance, yielding a continuously variable electrical potential indicative of the sensed characteristic. In these cases, sensor 128 may additionally comprise an analog to digital converter (ADC) as well as any additionally circuitry, such as without limitation a Wheatstone bridge, an amplifier, a filter, and the like. For instance, in some cases, sensor 128 may comprise a strain gage configured to determine loading of one or more aircraft components, for example and without limitation, landing gear. Strain gage may be included within a circuit comprising a Wheatstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 200, for instance without limitation a computing system, a pilot display, and a memory component. Alternatively or additionally, sensor 128 may sense a characteristic of a pilot control digitally. For instance in some embodiments, sensor 128 may sense a characteristic through a digital means or digitize a sensed signal natively. In some cases, for example, sensor 128 may include a rotational encoder and be configured to sense a rotational position of a pilot control or the like; in this case, the rotational encoder digitally may sense rotational "clicks" by any known method, such as without limitation magnetically, optically, and the like. Sensor 228 may include any of the sensors as disclosed in the present disclosure. Sensor 128 may include a plurality of sensors. Any of these sensors may be located at any suitable position in or on aircraft 200.

With continued reference to FIG. 2, sensor 128 may include any device configured to measure and/or detect information related to electric aircraft 200. In a non-limiting embodiment, first sensor may include airspeed sensors, GPS sensors, altimeters, pitot tubes, pitot-static tubes, sensors and/or systems, external air density sensors (e.g. to facilitate in the calculation of stall speed and/or wind speed), pressure sensors, toque sensors, angle sensors (e.g., angle of attack, flight path angle), wind speed sensors, and the like, among others.

Figure 3:
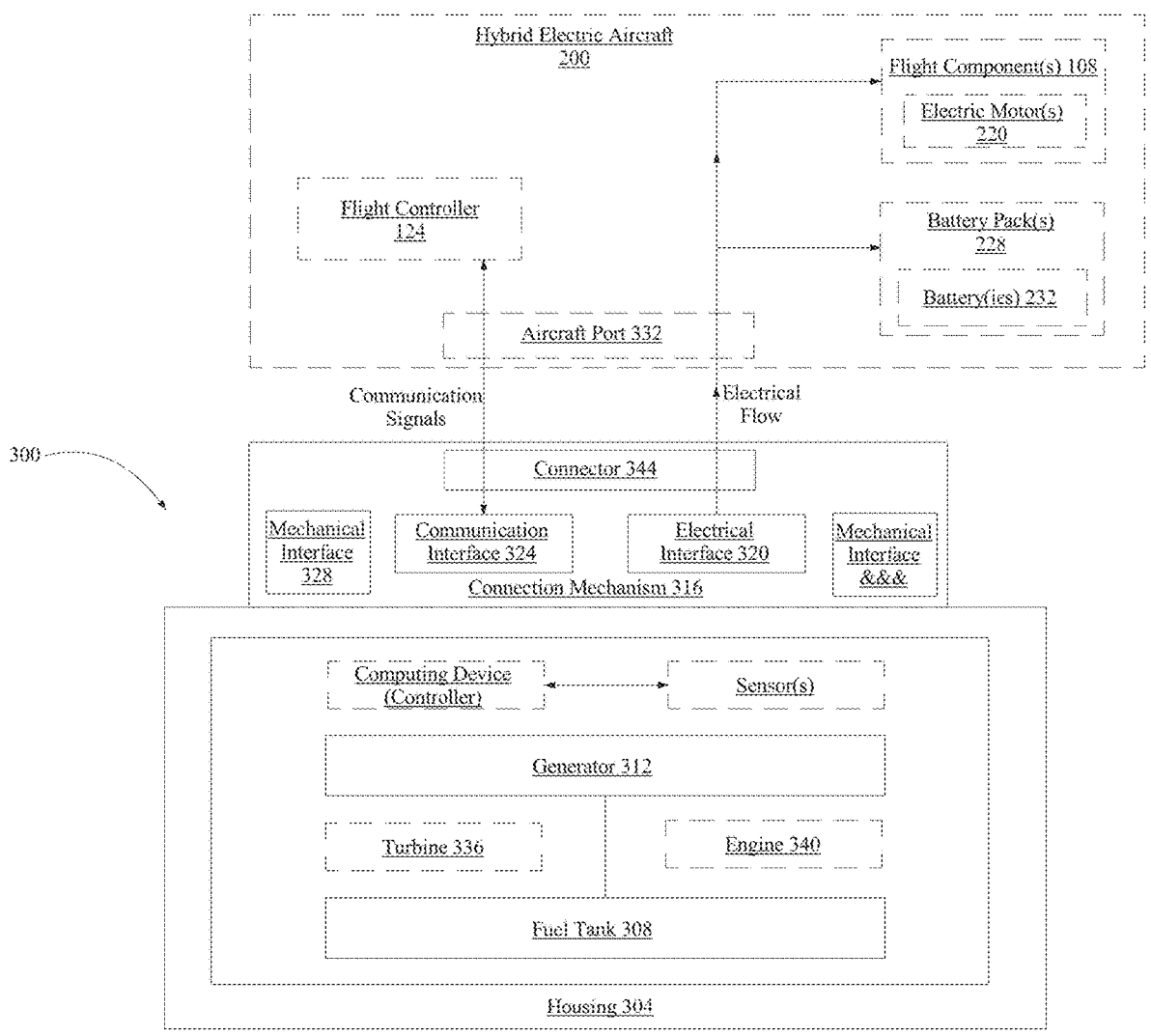
FIG. 3 is a block diagram of an exemplary embodiment of a fuel pod for a hybrid electric aircraft.

Referring now to FIG. 3, an exemplary embodiment of a fuel pod 300 for a hybrid electric aircraft is illustrated. Fuel pod may also be referred to as an auxiliary power pod or an auxiliary power unit (APU) herein. Hybrid electric aircraft can be the same, substantially the same or similar to any of the aircrafts as disclosed in the entirety of the present disclosure. For purposes of readability, some of the same reference numerals as used in FIG. 1 and FIG. 2 may be used to refer to like elements in FIG. 3.

Still referring to FIG. 3, in some embodiments, fuel pod 300 includes a housing 304, a fuel tank 308, a generator 312 and a connection mechanism 316. Fuel tank 308 is contained within housing 304. Fuel tank 308 is configured to hold a fuel therein. In some cases, fuel my already be contained in fuel tank 308. Generator 312 is contained within housing 304 and is connected to fuel tank 304. This connection can enable fuel tank 308 to provide fuel to generator 312 and/or an associated engine or turbine, for example, for combustion or burning of the fuel. Generator 312 (and/or fuel pod 300) is configured to power at least one of a plurality of flight components of hybrid electric aircraft. Hybrid electric aircraft may include any of the hybrid electric aircrafts as disclosed herein such as those described above with reference to at least FIG. 1 and FIG. 2 (e.g. aircraft 100 and 200). Flight components may include any of the flight components as disclosed herein such as those described above with reference to at least FIG. 1 and FIG. 2 (e.g. flight components 108).

Still referring to FIG. 3, connection mechanism 316 is at housing 304. Housing 304 may include connection mechanism 316 so that it is a part of housing or connection mechanism may be a separate element or combination of elements. Connection mechanism 316 is configured to removably or detachably attach or connect fuel pod 300 to hybrid electric aircraft. Connection mechanism 316 includes an electrical interface (or link) 320 configured to electrically link to at least one of plurality of flight components of hybrid electric aircraft. Connection mechanism 316 includes a communication interface (or link) 324 configured to communicatively link to a flight controller communicatively connected to hybrid electric aircraft. Flight controller may include any of the flight controllers as disclosed herein including those described with reference to at least FIG. 1, FIG. 2 (e.g. flight controller 124) and FIG. 6. For the purposes of this disclosure, "removably attached" means attached to an object such that it may be removed without damaging the object.

Continuing to refer to FIG. 3, and as also noted above, a "fuel pod" as used in this disclosure, is a pod with at least a fuel therein or a pod designed to hold at least a fuel therein. Fuel pod 300 may also be referred to as a 'drop tank', auxiliary power pod, or an auxiliary power unit (APU). In accordance with some embodiments, fuel pod 300 advantageously can be a self-contained unit which is selectively used with aircraft 200 as and when needed or desired. For example, fuel pod 300 may be utilized with aircraft 200 a achieve greater flight range, carry heavier payloads, carry extra passenger, and the like. Fuel pod 300 may not be used when aircraft 200 may carry out its flight plan without it. Fuel pod 300 may be replaced with extra payload, as needed or desired, which may be mounted to aircraft instead of fuel pod. Fuel pod 300 may be removably attached to any suitable surface of aircraft 200. In an embodiment, fuel pod 300 may be removably attached to a lower surface of a boom of aircraft 200. Two fuel pods 300 may be removably mounted on each of two booms of aircraft 200. Fuel pod 300 may be removably attached to fuselage of aircraft 200. Fuel pod 300, if needed, may be removably mounted internal to aircraft 300.

With continued reference to FIG. 3, as also noted above, for the purposes of this disclosure, a "fuel tank" is a container designed to hold fuel or a container with fuel therein. Each fuel tank 308 may contain a hydrocarbon fuel or a petroleum-based fuel which may be in a liquid or gaseous form and which may be compressed or pressurized. As used in this disclosure, a "pod" is a container or housing. Pod may be a detachable and/or self-contained unit. As used in this disclosure, a "fuel" is a material that is burned or undergoes combustion to produce power. Fuel may include, without limitation, a hydrocarbon fuel, a petroleum-based fuel, a gaseous fuel, a liquid fuel, a solid fuel, natural gas, oil, coal, gasoline, diesel, ethanol, hydrogen, or the like, among others.

Still referring to FIG. 3, and as also noted above, as used in this disclosure, a "generator" is a device that converts mechanical energy to electrical energy. For example, a generator may convert motive power (mechanical energy or kinetic energy) into electrical power for use in an external circuit such as an electric motor. Sources of mechanical energy may include, without limitation, steam turbines, gas turbines, water turbines, internal combustion engines, wind turbines, and the like, among others. As used in this disclosure, a "turbine" is a rotary mechanical device that extracts energy from a fluid flow and converts it into useful work. The work produced by a turbine can be used for generating electrical power when combined with a generator. As used in this disclosure, a "turbine generator" is an electric generator driven by a steam, gas or hydraulic turbine. As used in this disclosure, an "engine" is a machine that converts one or more forms of energy into mechanical energy. For example, and without limitation, an engine may convert energy from a source of heat, such as the burning or combustion of a fuel, into mechanical energy, force or motion. As used in this disclosure, an "internal combustion engine" or "ICE" is an engine in which the burning of a fuel occurs in a confined space called a combustion chamber.

Still referring to FIG. 3, housing 304 of fuel pod 300 may include, house or contain various self-contained components, as needed or desired. As used in this disclosure, a "housing" is a physical component within which other internal components are located. In some cases, internal components with housing will be functional while function of housing may largely be to protect the internal components. Housing 304 and/or fuel pod 300 may have a streamlined configuration, or the like, so as to minimize drag forces on aircraft 200 during flight, for example, and without limitation, an airfoil shape or configuration. Housing 304 may contain fuel tank 308 and generator 312 therein. Housing 304 may also contain, include or be attached to connection mechanism 316. Housing mechanism may also contain or include a computing device (or controller) and/or one or more sensors therein for facilitation communication between fuel pod 300 and aircraft 200 and/or monitoring diagnostics of fuel pod 300. Housing 304 may also contain a turbine 336 and/or engine 340. Turbine 336 and engine 340 may include any of the turbines and engines as disclosed in the entirety of the present disclosure. In an embodiment, and without limitation, housing may include a skin. Skin may be layered over the body shape of housing 304 which may be constructed by trusses as described above with reference to fuselage 104 of FIG. 1. Housing 304 and/or housing skin may comprise a plurality of materials such as plywood sheets, aluminum, fiberglass, and/or carbon fiber.

Still referring to FIG. 3, in an embodiment, connection mechanism 316 includes electrical interface (or link) 320 and communication interface (or link) 324. Connection mechanism 316 may include a connector 344 for facilitating removable or detachable interfacing between connection mechanism 316 and aircraft 200. Connection mechanism 316 may also include a mechanical interface 328 for removable mechanical attachment to aircraft 200. Alternatively, mechanical interface 328 may be separate from connection mechanism. As used in this disclosure, "connection mechanism" is a structure that facilitates connection or interfacing between two elements or relata. This may include an electrical connection, mechanical connection, fluidic connection, optical connection, magnetic connection, and the like, among others.

Continuing to refer to FIG. 3, as used in this disclosure, a "connector" is a distal end of a tether or a bundle of tethers, e.g., hose, tubing, cables, wires, and the like, which is configured to removably attach with a mating component, for example without limitation a port. As used in this disclosure, a "port" is an interface configured to receive another component or an interface configured to transmit and/or receive signal on a computing device. For example in the case of an electric vehicle port, the port may interface with a number of conductors. In the case of a computing device port, the port may provide an interface between a signal and a computing device. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port.

With continued reference to FIG. 3, connection mechanism 36, housing 304 and/or connector 344 may be configured to mate with a port, for example aircraft port 332. As used in this disclosure, "mate" is an action of attaching two or more components together. As used in this disclosure, an "aircraft port" is a port located on electric aircraft 200. Mating may be performed using a mechanical or electromechanical means described in this disclosure. For example, without limitation mating may include an electromechanical device used to join electrical conductors and create an electrical circuit. In some cases, mating may be performed by way of gendered mating components. A gendered mate may include a male component or plug which is inserted within a female component or socket. In some cases, mating may be removable. In some cases, mating may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment between connecting elements. In some cases, mating may be lockable. As used in this disclosure, a "mating component" is a component that is configured to mate with at least another component, for example in a certain (i.e., mated) configuration. Connector 344 may also be referred to as a "mating connector" in the present disclosure. Aircraft port 332 may also be referred to as a "mating aircraft port" in the present disclosure. In modified embodiments, aircraft port may be substituted for by a male connector.

Still referring to FIG. 3, as used in this disclosure, an "electrical interface" is a connection or link between two or more relata which facilitates transmission of electric current or electrical flow therebetween. As used in this disclosure, a "communication interface" is a connection or link between two or more relata which facilitates the transmission of communication and/or control signals therebetween. As used in this disclosure, a "mechanical interface" is a mechanical connection or link between two or more relata using mechanical means. Any of these interfaces may be temporary connections which can allow detachable connection or removable attachment between.

Still referring to FIG. 3, in some embodiments, mechanical interface 328 my include a latching mechanism which enables or facilitates removable or detachable mechanical attachment to or mating with aircraft 200. Aircraft 200 may have a compatible and/or mating latching mechanism to facilitate such removable attachment. Advantageously, this adds a new dimension of versatility as, depending on the payload, flight conditions, and/or destination of the aircraft, fuel pod(s) 300 may be selectively utilized. A mating latching mechanism may be provided at any suitable location on aircraft such as, and without limitations, internal or external to booms, wings and fuselage of aircraft. As used in this disclosure, a "latching mechanism" is any mechanism or device that allows for removable or detachable connection between two elements. Latching mechanism may include, without limitation, latches, fasteners, clamps, buckles, locks, clips, actuators, bolts, screws, bolt-nut combinations, connectors which may be manually, electronically, magnetically and/or remotely operable to detachably connect, attach or fasten elements. Compatible and/or mating latching mechanism and elements may be provided on both fuel pod and aircraft. Connection mechanism 316, connector 344 and/or mechanical interface 328 may include a fastener. As used in this disclosure, a "fastener" is a physical component that is designed and/or configured to attach or fasten two (or more) components together. Fasteners may include threads, snaps, canted coil springs, and the like. Fasteners may include without limitation hook-and-loop fasteners such as or fasteners held together by a plurality of flanged or "mushroom"-shaped elements. In some cases, Fastener may be configured to provide removable attachment between fuel pod 300 and aircraft 200. Removable attachment can be considered to be an attributive term that refers to an attribute of one or more relata to be attached to and subsequently detached from another relata; removable attachment is a relation that is contrary to permanent attachment wherein two or more relata may be attached without any means for future detachment without damage to at least one of the relata. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata.

Still referring to FIG. 3, fuel pod 300 may be removably attachable to at least a boom (e.g. booms 136 of FIG. 1) of hybrid electric aircraft 200. Fuel pod 300 may be removably attachable to a lower surface of boom. A pair of fuel pods 300 may be provided with each fuel pod respectively attachable to a respective boom. Alternatively, or in addition, one or more fuel pods 300 may be removably attachable to wings, fuselage and other structures of aircraft, as needed or desired.

Continuing to refer to FIG. 3, generator 312 may include any of the generators as disclosed in the present disclosure. Generator 312 may be configured to electrically connect to at least an electric motor 220 of plurality of flight components 108. Generator 312 may be configured to power at least an electric motor 220 of plurality of flight components 108. Generator 312 may be configured to power at least a lift component (e.g. lift component 112 of FIG. 1) of plurality of flight components 108 either directly or indirectly via an intervening electric motor or the like. Generator 312 may be configured to power at least a pusher component (e.g. pusher component 116 of FIG. 1) of plurality of flight components 108 either directly or indirectly via an intervening electric motor or the like. Generator 312 may be configured to power at least a propulsor of plurality of flight components 108 either directly or indirectly via an intervening electric motor. These electrical connections and powering may be via or facilitated by electrical interface 320.

Still referring to FIG. 3, generator 312 may be configured to electrically connect to at least a battery 232 of hybrid electric aircraft 200. Generator 312 may be configured to charge or recharge at least a battery 232 of hybrid electric aircraft 200. These electrical connections and charging (or recharging) may be via or facilitated by electrical interface 320.

Still referring to FIG. 3, fuel pod 300 may further include a computing device or controller configured to communicatively connect with flight controller 124 of hybrid electric aircraft 200. Computing device or controller may be configured to communicatively connect with flight controller 124 of hybrid electric aircraft 200 via communication interface 324. Communication interface may be configured to conduct signals (e.g. communication signals, control signals, monitoring signals, and the like) between flight pod computing device or controller and flight controller 124.

Still referring to FIG. 3, fuel pod 300 may further include at least a sensor. Sensor may include any suitable sensor, plurality of sensors or sensor suite as disclosed in the entirety of the present disclosure. Sensor may be communicatively connected to computing device or controller of fuel pod 300. Alternatively, or in addition, sensor may be communicatively connected to flight controller 124. Sensor may be configured to detect an electric current emanating from or through generator 312, fuel pod 300 and/or electrical interface 320. Sensor may be configured to detect a fuel level (or remaining fuel capacity) of fuel tank 308. Sensor may include a temperature sensor, or the like.

Continuing to refer to FIG. 3, connection mechanism 316 may further include connector or mating connector 344 configured to mate with hybrid electric aircraft 200. Connector or mating connector 344 may be configured to mate with aircraft port 332 of hybrid electric aircraft 200. Connector or mating connector 344 may be configured to mate with aircraft port 332 at a boom of hybrid electric aircraft 200. At least a portion of electrical interface 320 and at least a portion of communication interface 324 may be located at connector or mating connector 344. Electrical interface 320 may be configured to conduct an electrical flow from fuel pod 300 to hybrid electric aircraft 200.

With continued reference to FIG. 3, connection mechanism 316 may further include mechanical interface 328 configured to removably attach fuel pod 300 to hybrid electric aircraft 200. Alternatively, or in addition, mechanical interface 328 or a portion of it may be separate from connection mechanism 316 and/or connector 344. Mechanical interface 328 may include a latching mechanism, or the like, to removably connect or attach fuel pod 300 to aircraft 200.

Figure 4:
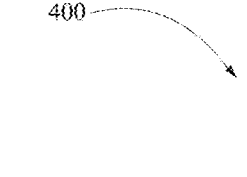
FIG. 4 is a block diagram of an exemplary embodiment of a power system for a hybrid electric aircraft.
Figure 4:
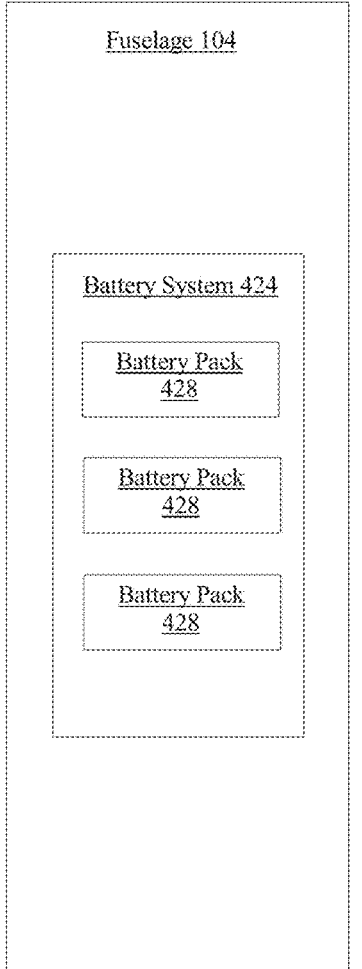
Figure 4:
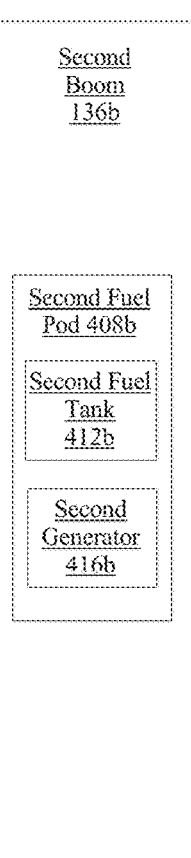

Referring now to FIG. 4, another exemplary embodiment of a power system 400 for a hybrid electric aircraft is illustrated. Hybrid electric aircraft can be the same, substantially the same or similar to any of the aircrafts as disclosed in the entirety of the present disclosure. For purposes of readability, the same reference numerals as FIG. 1 may be used to refer to like elements in FIG. 4. Power system 400 may include one or more sensors which may include any of the sensors as disclosed in the entirety of the present disclosure. Power system 400 may include a computing device or controller which may include any of the computing devices and/or controllers as disclosed in the entirety of the present disclosure. Computing device may be communicatively connected to sensor(s) and/or any other components of power system 400 for purposes of controlling operation of power system 400 and its associated aircraft.

Still referring to FIG. 4, power system 400 may include a battery system 424 and a fuel system. Battery system 424 may be housed in a fuselage 104 of hybrid electric aircraft. In a non-limiting example, battery system 424 may include three battery packs 428. In modified embodiments, the number of battery packs (and batteries therein) may be efficaciously changed, as needed or desired, depending on factors such as flight plan, flight destination, payload, and the like, among others. Battery system 424 and/or battery packs 428 may be housed in one or more bays in fuselage 104.

Continuing to refer to FIG. 4, power system 400 may include a fuel system with a first fuel pod 408a and a second fuel pod 408b. Fuel pod 408a may be attached to first boom 136a of aircraft. Fuel pod 408b may be attached to second boom 136b of aircraft. First fuel pod 408a may contain a first fuel tank 412a and a generator 416a. Second fuel pod 408b may contain a second fuel tank 412b and a second generator 416b. A latching mechanism may be provided to attach fuel pods to booms of aircraft. Fuel pods may be removably or detachably attached to booms of aircraft. This attachment may involve a "bolt-on" configuration. Hard mounting points may also be utilized for the attachment of fuel pods. Fuel pods may also be referred to as "drop tanks" and/or auxiliary power units (APUs). In a non-limiting example, fuel pods 408a, 408b may each have a power capacity in the range from about 60 kW to about 85 kW.

Figure 5:
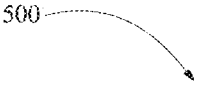
FIG. 5 is a block diagram of another exemplary embodi-ment of a power system for a hybrid electric aircraft.
Figure 5:
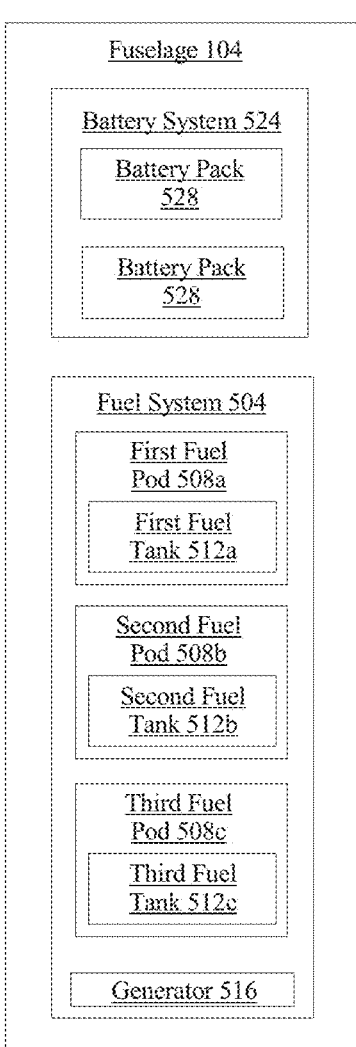

Referring now to FIG. 5, yet another exemplary embodiment of a power system 500 for a hybrid electric aircraft is illustrated. Hybrid electric aircraft can be the same, substantially the same or similar to any of the aircrafts as disclosed in the entirety of the present disclosure. For purposes of readability, the same reference numerals as FIG. 1 may be used to refer to like elements in FIG. 5. Power system 500 may include one or more sensors which may include any of the sensors as disclosed in the entirety of the present disclosure. Power system 500 may include a computing device or controller which may include any of the computing devices and/or controllers as disclosed in the entirety of the present disclosure. Computing device may be communicatively connected to sensor(s) and/or any other components of power system 400 for purposes of controlling operation of power system 500 and its associated aircraft.

Still referring to FIG. 5, power system 500 may include a battery system 524 and a fuel system 504. Battery system 524 may be housed in a fuselage 104 of hybrid electric aircraft. In a non-limiting example, battery system 524 may include two battery packs 528. In modified embodiments, the number of battery packs (and batteries therein) may be efficaciously changed, as needed or desired, depending on factors such as flight plan, flight destination, payload, and the like, among others. Battery system 524 and/or battery packs 528 may be housed in one or more bays in fuselage 104.

Continuing to refer to FIG. 5, power system 500 may include a fuel system with a first fuel pod 508a, a second fuel pod 508b, a third fuel pod 508c and a generator 516. Fuel pods 508a, 508b, 508c may be housed in one or more bays in fuselage 104. First fuel pod 508a may contain a first fuel tank 512a. Second fuel pod 508b may contain a second fuel tank 512b. Third fuel pod 508c may contain a third fuel tank 512c. A latching mechanism may be provided to attach fuel pods to fuselage of aircraft. Fuel pods may be removably or detachably attached to fuselage of aircraft. This attachment may involve a "bolt-on" configuration. Hard mounting points may also be utilized for the attachment of fuel pods. Fuel pods may also be referred to as "drop tanks" and/or auxiliary power units (APUs). Generator 516 may be provided in fuselage 104 of aircraft. Generator may be spaced from fuel pods. In an embodiment, generator 516 may be fixedly attached to fuselage 104 and may be integral to aircraft. In a modified embodiment, generator 516 may be removably or detachably attached to aircraft. In a non-limiting example, fuel system 504 may have a power capacity in the range from about 250 kW to about 500 kW.

Now referring to FIG. 6, an exemplary embodiment 600 of a flight controller 604 is illustrated. (Flight controller 124 of FIG. 1 and FIG. 2 may be the same as or similar to flight controller 604.) As used in this disclosure a "flight controller" is a computing device of a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q–k–1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component 108. As used in this disclosure (and with particular reference to FIG. 6) a "flight component" is a portion of an aircraft that can be moved or adjusted to affect one or more flight elements. For example, flight component 108 may include a component used to affect the aircrafts' roll and pitch which may comprise one or more ailerons. As a further example, flight component 108 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 108. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs x/that may receive numerical values from inputs to a neural network containing the node and/or from other nodes. Node may perform a weighted sum of inputs using weights $w_i$ that are multiplied by respective inputs x1. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input x, may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
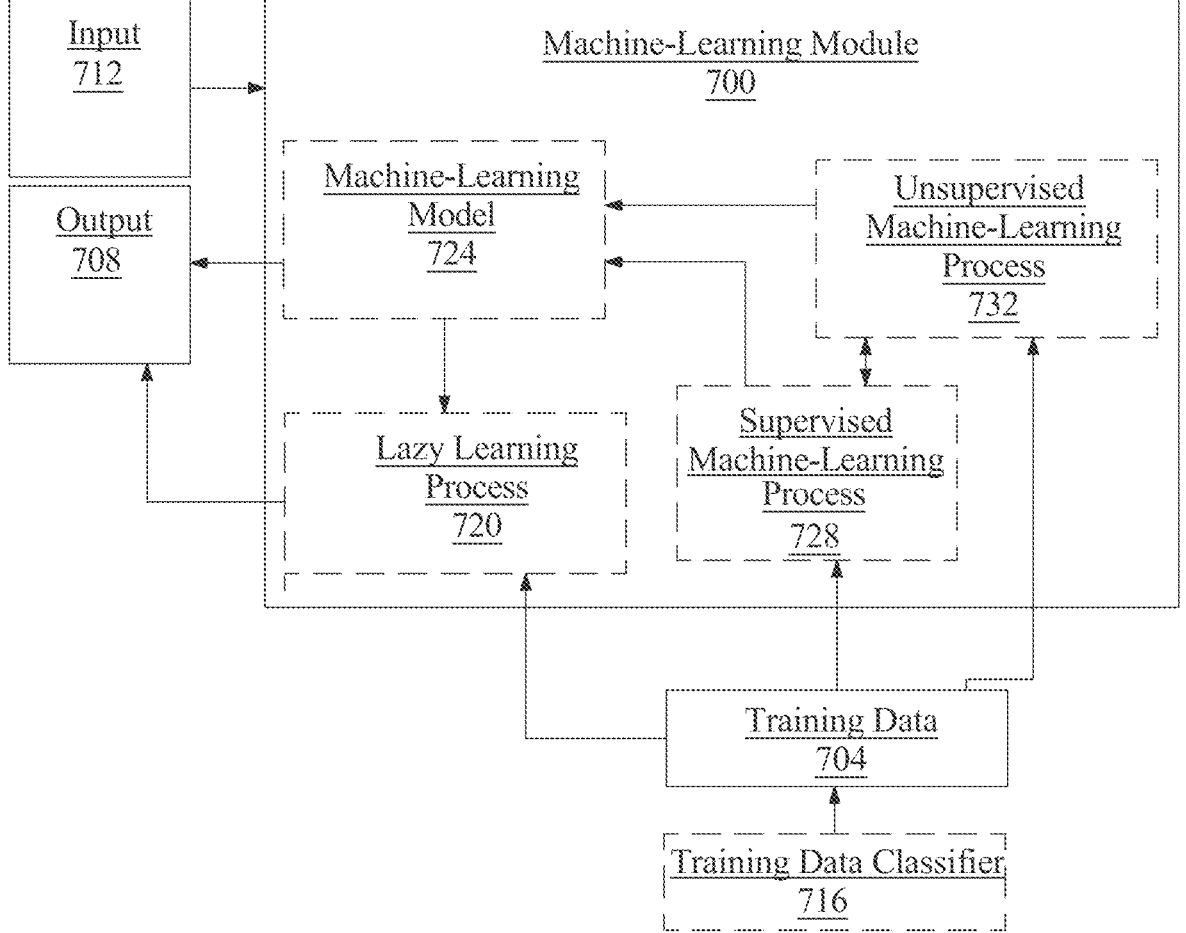
FIG. 7 is a block diagram of an exemplary embodiment of a machine-learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine-learning processes. A "machine-learning process," as used in this disclosure, is a process that automatedly uses training data 704 to generate an algorithm that will be performed by a computing device/module to produce outputs 708 given data provided as inputs 712; this is in contrast to a non-machine-learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example flight elements and/or pilot signals may be inputs, wherein an output may be an autonomous function.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to sub-categories of flight elements such as torques, forces, thrusts, directions, and the like thereof.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
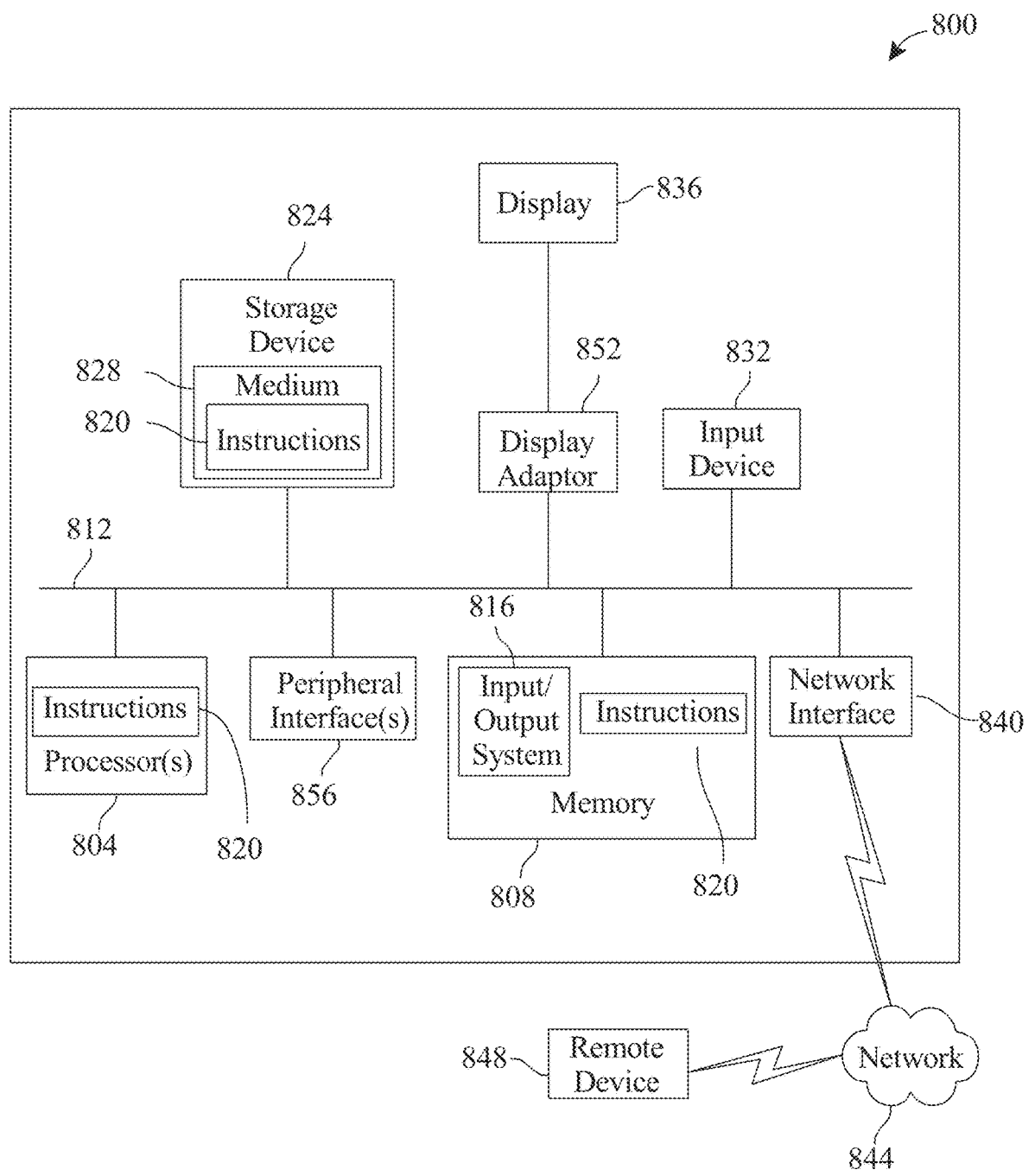
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A hybrid electric aircraft comprising:

a flight component configured to propel the hybrid electric aircraft;

a battery configured to selectively power the flight component;

a flight controller configured to control operation of the hybrid electric aircraft; and a fuel pod comprising:

a housing;

a fuel tank contained within the housing, wherein the fuel tank is configured to hold a fuel therein;

a generator contained within the housing and connected to the fuel tank, wherein the generator is configured to power one or more of the battery and the flight component, wherein the generator is configured to recharge the battery during operation; and a connection mechanism at the housing, wherein the connection mechanism is configured to releasably attach the fuel pod to a surface of the hybrid electric aircraft, wherein the connection mechanism comprises:

an electrical interface configured to electrically link the fuel pod to the flight component.

2. The hybrid electric aircraft of claim 1, wherein the hybrid electric aircraft comprises an electric vertical takeoff and landing aircraft.

3. The hybrid electric aircraft of claim 1, wherein the fuel pod is attached to a wing of the hybrid electric aircraft.

4. The hybrid electric aircraft of claim 1, wherein the fuel pod is attached to a boom of the hybrid electric aircraft.

5. The hybrid electric aircraft of claim 1, wherein the battery is mounted within a fuselage of the hybrid electric aircraft.

6. The hybrid electric aircraft of claim 1, wherein the fuel pod further comprises a sensor, wherein the sensor is communicatively connected to the flight controller.

7. The hybrid electric aircraft of claim 6, wherein the sensor is configured to detect characteristics associated with the battery.

8. The hybrid electric aircraft of claim 6, wherein the sensor is configured to detect an electric current emanating from the generator.

9. The hybrid electric aircraft of claim 6, wherein the sensor is configured to detect a flight mode of the hybrid electric aircraft.

10. The hybrid electric aircraft of claim 1, wherein the flight component comprises a propulsor component.

11. The hybrid electric aircraft of claim 10, wherein the propulsor component comprises an electric motor.

12. The hybrid electric aircraft of claim 10, wherein the propulsor component comprises at least a lift component.

13. The hybrid electric aircraft of claim 10, wherein the propulsor component comprises a pusher component.

14. The hybrid electric aircraft of claim 1, wherein the flight controller is configured to selectively engage at least one of the battery and the generator to power the flight component as a function of a flight mode of the hybrid electric aircraft.

15. The hybrid electric aircraft of claim 14, wherein the flight mode comprises fixed-wing based flight.

16. The hybrid electric aircraft of claim 14, wherein the flight mode comprises rotor-based flight.

17. The hybrid electric aircraft of claim 1, wherein the flight controller is configured to selectively engage at least one of the battery and the generator to power the flight component as a function of a state of charge of the battery.

18. The hybrid electric aircraft of claim 1, wherein the battery and the generator are configured to power the flight component simultaneously.

19. The hybrid electric aircraft of claim 1, wherein the connection mechanism further comprises an aircraft port of the hybrid electric aircraft.

* * * * *